Patented Mar. 22, 1949

2,465,313

UNITED STATES PATENT OFFICE 2,465,313

ALPHA IRON OXIDE-ALKALI METAL PYRO-ANTIMONIATE CATALYST AND PROCESS OF PREPARATION

Max A. Mosesman, Baytown, Tex., assignor, by mesne assignments, to Standard Oil Development Company, Elizabeth, N. J., a corporation of Delaware No Drawing. Original application December 20, 1946, Serial No. 717,584. Divided and this application June 9, 1948, Serial No. 32,055

11 Claims. (Cl. 252—474)

1

The present invention is directed to a method for preparing a composition adapted to be used as a catalyst.

This application is a division of Serial No. 717,584, filed December 20, 1946, now U. S. Patent No. 2,454,398.

It is known to the art to pass a mixture of carbon monoxide and hydrogen at elevated temperatures and pressures over a catalyst to obtain hydrocarbons and oxygenated derivatives of hydrocarbons as product. When carrying out such reactions it is preferred to employ a temperature in the range of 450° to 675° F. and a pressure in the range of 100 to 500 lbs./sq. in. Such processes of reacting hydrogen and carbon monoxide to obtain hydrocarbon product are usually designated as a Fischer-Tropsch synthesis. Heretofore when conducting such reactions it has been customary to employ oxides of such metals as iron, cobalt and nickel as a catalyst; the oxides may be used alone but preferably are used as supported catalysts which are formed by impregnating aluminum oxide, kieselguhr, or similar carriers with one or more of the desired oxides.

It is an object of the present invention to devise a method for preparing a catalyst. More particularly, it is an object of the present invention to devise a method for preparing a catalyst particularly adapted for use in the Fischer-Tropsch synthesis.

The present invention may be described briefly as involving the preparation of a mixture of iron oxide and an alkali metal pyroantimoniate, heating the mixture to a high temperature in the presence of an oxidizing atmosphere for a sufficient time to oxidize substantially the mass, and then contacting the oxidized mass with a reducing atmosphere at super-atmospheric temperature to obtain an active metallic mass.

The alkali metal pyroantimoniate employed in preparing the catalyst in the persent invention is preferably potassium pyroantimoniate. However, the sodium or lithium pyroantimoniates may suitably be employed under some conditions. In preparing the catalyst it is preferred to use the alkali metal pyroantimoniate in an amount between 0.2 and 20% of the catalyst mass and the iron oxide in an amount between 80 and 99.8% of the catalyst mass.

The iron oxide component employed in preparing the catalyst may suitably be ferro-ferric oxide or it may be alpha or gamma iron oxide. Either one of the three forms may be employed in obtaining good yields of hydrocarbons and oxygenated compounds in the synthesis of hydrocarbons from carbon monoxide and hydrogen.

In describing the method for preparing the catalyst mass, reference is made to employment of potassium pyroantimoniate. It is to be understood that the description is given for illustrative purpose only. In preparing the potassium pyroantimoniate, 100 parts of potassium hydroxide are heated in a suitable container until the mass is fused. To the fused molten mass is added gradually 12.6 parts of $Sb_2O_5$, following which the mixture is heated for approximately 15 minutes and allowed to cool. The cooled reaction mixture has added to it approximately 200 parts of distilled water and is then thoroughly agitated and filtered. The filtrate is set aside while the residue has added to it 100 parts of molten potassium hydroxide. Additional amounts of potassium hydroxide to the extent of 20 parts are then added and the total mixture heated for about 15 minutes, cooled and washed with 200 parts of distilled water. Following the washing treatment, the reaction body is thoroughly stirred and refiltered. The second filtrate is then combined with the first filtrate which has previously been set aside and the combined filtrates evaporated at a reduced pressure at a temperature of 50° C. until crystallization occurs. The crystals which separate are filtered free from liquor and are substantially pure potassium pyroantimoniate ($K_4Sb_2O_7$).

The crystalline material is further purified by washing with absolute alcohol until substantially free of alkali. The washed crystals are dried at about 97° C. and then a selected amount is added to a weighed amount of iron oxide such as ferro-ferric oxide, preferably an amount of the purified pyroantimoniate sufficient to give a catalyst composition of 5% potassium pyroantimoniate and 95% iron oxide, and the resultant mixture, after the addition of sufficient alcohol to permit mixing, is slurried to a thick, smooth paste. This paste is then dried at 107° C. to form a solid cakelike mass which is ground to pass a 30 mesh screen, redried and formed into pills. The pilled material is then heated in a free oxygen-containing atmosphere at 1000° F. for about 4½ hours and allowed to cool to obtain the finished catalyst.

Preferably, before the catalyst prepared in the foregoing manner is employed in synthesis of hydrocarbons from carbon monoxide and hydrogen, it should be reduced with a reducing gas such as hydrogen or carbon monoxide at a temperature of approximately 500° to approximately 900° F. When hydrogen is the reducing gas, a temperature of about 700° F. and a hydrogen gas rate of about 1000 volumes per volume of catalyst per hour should be employed.

The catalyst prepared in the above described manner is highly active in synthesizing hydrocarbons over an appreciable period of time. For example, over an 816 hour period when employing a catalyst comprising 95% iron oxide and 5% potassium pyroantimoniate at a temperature between 550° and 575° F., $C_4$ and heavier hydrocarbons in an amount between 192 and 198 cc. per cubic meter of feed gas were obtained. During the same period of operation substantial quantities of water were obtained, varying from 29 to as high as 138 and averaging about 50 cc. per cubic meter of feed gas. The hydrocarbons produced contained substantial quantities of olefins, alcohols calculated as amyl alcohol, aldehydes and organic acids, while the water contained appreciable quantities of alcohols calculated as ethyl alcohol, aldehydes and organic acids.

While the invention has been described with reference to the employment of iron oxide as one component of the catalyst composition, it is intended that iron filings or iron powder may be substituted for the iron oxide. On subjecting the composition to the free oxygen-containing atmosphere, the elemental iron would be converted to the oxide. Similarly, while the reducing gas has been illustrated by the use of hydrogen, it is also possible to employ carbon monoxide as the reducing agent. When employing carbon monoxide in lieu of hydrogen as the reducing agent, lower temperatures of the order of 500° to 700° F. may be used.

While examples of temperature and pressure conditions suitable for use in the practice of the present invention have been given to illustrate the advantages of the present invention, it will be obvious to a worker skilled in the art that temperatures and pressures over a substantial range may be employed and good results obtained. It will also be obvious that the alkali metal pyroantimoniate admixed with the iron oxide may be present over a substantial range and satisfactory results obtained. Accordingly, it is intended to embrace such ranges by the claims appended hereto.

The nature and objects of the present invention having been fully described and illustrated, what I wish to claim as new and useful and to secure by Letters Patent is:

1. A method for preparing a catalyst adapted for use in a Fischer-Tropsch synthesis which includes the steps of preparing a mixture of alpha iron oxide in an amount in the range between 80% and 99.8% by weight and an alkali metal pyroantimoniate in an amount in the range between 0.2 and 20% by weight, heating said admixture at a superatmospheric temperature of about 1000° F. in the presence of a free oxygen-containing atmosphere, and subsequently contacting the admixture with a reducing atmosphere at a superatmospheric temperature in the range from 500° to 900° F.

2. A method in accordance with claim 1 in which the alkali metal pyroantimoniate is potassium pyroantimoniate.

3. A method in accordance with claim 1 in which the alkali metal pyroantimoniate is sodium pyroantimoniate.

4. A method in accordance with claim 1 in which the alkali metal pyroantimoniate is lithium pyroantimoniate.

5. A method for producing a catalyst suitable for use in the Fischer-Tropsch synthesis comprising the steps of admixing alpha iron oxide with potassium pyroantimoniate and alcohol to form a paste, the proportions of said admixture being adjusted to provide a finished catalyst consisting of about 95% by weight of alpha iron oxide and about 5% by weight of potassium pyroantimoniate, drying the paste to form a solid cake-like mass, grinding the caked mass and forming it into pellets, subjecting said pellets to a free oxygen-containing atmosphere at a temperature of about 100° F. and subsequently to a reducing atmosphere at an elevated temperature in the range of 500° to 900° F. to obtain the finished catalyst.

6. A method for preparing a catalyst suitable for use in a Fischer-Tropsch synthesis which consists of the steps of preparing a mixture of alpha iron oxide in an amount in the range between 80% and 99.8% by weight and an alkali metal pyroantimoniate in an amount in the range between 0.2 and 20% by weight, heating said admixture to a temperature of about 1000° F. for about 4 hours in the presence of a free oxygen-containing atmosphere and subsequently contacting the admixture with a reducing atmosphere at a temperature of about 700° F.

7. A composition adapted for use as a catalyst in the production of hydrocarbons and oxygenated hydrocarbons which consists of alpha iron oxide and an alkali metal pyroantimoniate in intimate admixture therewith in an amount in the range between 0.2 and 20% by weight of said alpha iron oxide which mixture has been contacted with an oxidizing atmosphere at a temperature of about 1000° F. and then with a reducing atmosphere at a temperature in the range from 500° to 900° F.

8. A composition in accordance with claim 7 in which the alkali metal pyroantimoniate is potassium pyroantimoniate.

9. A composition in accordance with claim 7 in which the alkali metal pyroantimoniate is sodium pyroantimoniate.

10. A composition in accordance with claim 7 in which the alkali metal pyroantimoniate is lithium pyroantimoniate.

11. A composition adapted for use as a catalyst in the production of hydrocarbons and oxygenated hydrocarbons consisting of an intimate mixture of approximately 95% by weight of alpha iron oxide and approximately 5% by weight of potassium pyroantimoniate, which mixture has been heated in the presence of a free oxygen-containing atmosphere at a temperature of about 1000° F. and subsequently heated in a reducing atmosphere including free hydrogen at a temperature of about 700° F.

MAX A. MOSESMAN.

No references cited.